United States Patent
Meneghini et al.

(10) Patent No.: US 10,139,529 B2
(45) Date of Patent: Nov. 27, 2018

(54) DEFORMABLE LENS STRUCTURE FOR ADAPTIVE OPTICS DEVICES

(71) Applicant: ADAPTICA S.R.L., Padua (IT)

(72) Inventors: Gianlugi Meneghini, Selvazzano Dentro (IT); Stefano Bonora, Porto Mantovano (IT); Alessandro Brunelli, Vicenza (IT)

(73) Assignee: ADAPTICA S.R.L., Padua (IT)

( * ) Notice: Subject to any disclaimer, the term of this patent is extended or adjusted under 35 U.S.C. 154(b) by 0 days.

(21) Appl. No.: 15/114,610

(22) PCT Filed: Jan. 27, 2015

(86) PCT No.: PCT/IB2015/050605
§ 371 (c)(1),
(2) Date: Jul. 27, 2016

(87) PCT Pub. No.: WO2015/114514
PCT Pub. Date: Aug. 6, 2015

(65) Prior Publication Data
US 2016/0349506 A1    Dec. 1, 2016

(30) Foreign Application Priority Data

Jan. 28, 2014 (IT) .............................. TV2014A0015

(51) Int. Cl.
*G02B 3/12* (2006.01)
*G02B 1/06* (2006.01)
(Continued)

(52) U.S. Cl.
CPC ................ *G02B 3/12* (2013.01); *G02B 1/06* (2013.01); *G02B 3/14* (2013.01); *G02B 27/0068* (2013.01); *G02C 7/085* (2013.01)

(58) Field of Classification Search
CPC ... G02B 1/06; G02B 3/12; G02B 3/14; G02C 7/085
(Continued)

(56) References Cited

U.S. PATENT DOCUMENTS

2005/0030438 A1    2/2005 Nishioka
2007/0263293 A1    11/2007 Batchko et al.
(Continued)

FOREIGN PATENT DOCUMENTS

| CN | 1580834 A | 2/2005 |
|---|---|---|
| CN | 102947730 A | 2/2013 |
| EP | 2239600-1 A | 10/2010 |

OTHER PUBLICATIONS

Office Action dated Apr. 23, 2018 issued in corresponding Chinese Patent Application No. 201580010622.5, pp. 1-10.

*Primary Examiner* — Darryl J Collins
(74) *Attorney, Agent, or Firm* — Polsinelli PC

(57) ABSTRACT

A deformable lens structure includes: a deformable first layer having a first outer surface adapted to receive an incident light beam, and a first inner surface opposite the first outer surface; at least a first central portion of the first layer being transparent to the light beam; a second layer having a second inner surface facing the first inner surface and a second outer surface opposite the second inner surface, at least a second central portion of the second layer being transparent to the light beam; a shaped spacer element positioned between the first inner surface and the second inner surface, and an inner chamber containing a liquid transparent to the light beam; first and second electrostatic actuators operatively associated with the first layer and second layers and positioned at the first central portion of the first layer and at the second central portion of the second layer, respectively.

25 Claims, 13 Drawing Sheets

Figure 1:
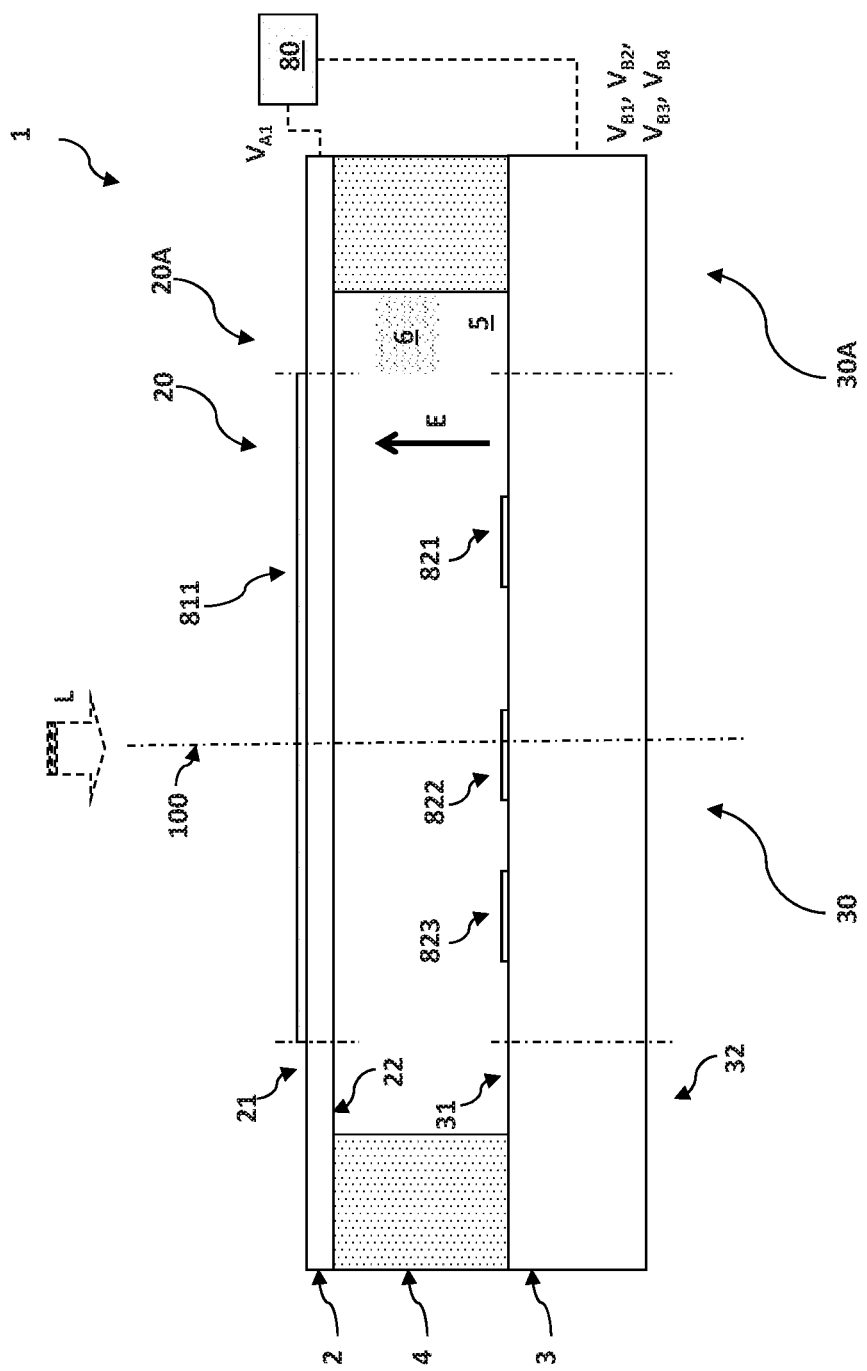

(51) Int. Cl.
*G02B 3/14* (2006.01)
*G02B 27/00* (2006.01)
*G02C 7/08* (2006.01)

(58) Field of Classification Search
USPC ................ 359/665–667; 351/159.34, 159.68
See application file for complete search history.

(56) References Cited

U.S. PATENT DOCUMENTS

| | | | |
|---|---|---|---|
| 2008/0144185 A1* | 6/2008 | Wang | G02B 3/14 359/665 |
| 2010/0208357 A1* | 8/2010 | Batchko | G02B 3/14 359/666 |
| 2012/0069450 A1 | 3/2012 | Bolis | |
| 2013/0176628 A1* | 7/2013 | Batchko | G02B 3/12 359/665 |

* cited by examiner

DEFORMABLE LENS STRUCTURE FOR ADAPTIVE OPTICS DEVICES

CROSS REFERENCE TO RELATED APPLICATIONS

This application is a National Phase filing under 35 U.S.C. § 371 of PCT/IB2015/050605 filed on Jan. 27, 2015; and this application claims priority to Application No. TV2014A000015 filed in Italy on Jan. 28, 2014 under 35 U.S.C. § 119. The entire contents of each application are hereby incorporated by reference.

The present invention relates to the technical field of adaptive optics devices.

In particular, the present invention relates to a deformable lens structure that can be used in an optical device to dynamically transform the wavefront of a light beam.

It is widely known that the performance of an optical system, through which a light beam passes, is greatly influenced by the presence of optical aberrations (such as defocus, astigmatism, coma, spherical aberration, etc.) in the wavefront of the aforesaid light beam.

To address these problems, in various types of optical systems (for example, in the field of astronomy, medicine, microscopy or telecommunications) it is known to incorporate adaptive optics devices dedicated to controlling the wavefront of light beams.

Some devices for correction of the wavefront are produced by means of deformable mirrors, in which case it is necessary to design complicated layouts for the optical path of the system due to the presence of the deformable mirror.

An alternative is to provide systems that obtain deformation of the wavefront by transmission and not reflection, which we refer to by indicating deformable lenses.

Within the scope of deformable lenses, some adaptive optics devices of known type are arranged so as to apply predetermined corrections to the wavefront of a light beam. These devices can, for example, comprise lenses having shaped surfaces or layers of material having a given gradient of the refractive index. A device of this type is described in the patent application WO 2013/056380.

Other adaptive optics devices of known type are capable of dynamically correcting the wavefront of an incident light beam.

Among the devices of this type, adaptive optics devices comprising deformable lenses must undoubtedly be mentioned.

An example of device comprising a deformable lens structure is described in the U.S. Pat. No. 7,719,771.

This device comprises a deformable solid lens operatively associated with electrodes that supply electrical voltages on opposite surfaces of this lens. The voltages supplied to the electrodes generate electrostatic forces capable of deforming the solid lens in a controlled manner. In this way, it is possible to correct the focal distance of a light beam that passes through the solid lens.

Another example of device comprising a deformable lens structure is described in the U.S. Pat. No. 8,422,142.

In this device, the lens structure is provided with an inner chamber containing a fluid, maintained at a constant volume. A wall of the inner chamber is formed by a deformable membrane having a central portion without actuators, adapted to receive an incident light beam, and an actuation portion, at which electrostatic or piezoelectric actuator means are provided. By acting on the actuation portion of the deformable membrane, the aforesaid actuator means cause a movement of the fluid between different regions of the inner chamber. This causes a deformation of the membrane. It must be mentioned how, in this example, the actuator means do not directly cause deformation of the portion of membrane through which the light beam passes, but simply cause a movement of fluid from a peripheral region to a central region of the lens structure. This movement of fluid in turn causes a deformation of the membrane in the central portion through which the light beam passes.

A further example of device comprising a deformable lens structure is described in the U.S. Pat. No. 8,072,574.

In this device, the lens structure comprises a liquid crystal layer having an optical power variable as a function of an electric or magnetic field applied. Magnetic or electrostatic actuator means are suitably arranged to selectively adjust the optical power of this liquid crystal layer, so as to correct the optical power and the whole wavefront by independently adjusting the Zernike components of the front of a light beam that passes through it.

Current adaptive optics devices provided with deformable lenses have some problems. Typically, they offer unsatisfactory performance in relation to the correction of aberrations of an order higher than the second.

Therefore, these devices are often unsuitable for use in optical systems whose performance is deteriorated by high order aberrations, for example in optical systems dedicated to laser scanning apparatus, to precision machining and additive manufacturing apparatus based on lasers or to applications in the field of ophthalmology, astronomy, security controls and microscopy.

Moreover, current adaptive optics devices often have structures that are relatively complex, bulky and costly to produce on an industrial scale.

The main aim of the present invention is to provide a deformable lens structure for adaptive optics devices that enables the problems of the art indicated above to be resolved.

Within the scope of this aim, an object of the present invention is to provide a lens structure that enables the optical aberrations of a light beam, even of a high order, to be effectively corrected.

A further object of the present invention is to provide a deformable lens structure that is easy to incorporate in an adaptive optics device or in an optical system.

A further object of the present invention is to provide a deformable lens structure that is easy to produce on an industrial scale, at competitive costs.

This aim and these objects, as well as other objects that will be apparent from the description below and from the accompanying drawings, are achieved, according to the invention, by a lens structure according to claim 1, proposed below.

In another aspect, the present invention relates to an adaptive optics device comprising the lens structure according to the invention.

In a further aspect thereof, the present invention relates to an optical system comprising the lens structure according to the invention.

Figure 2:
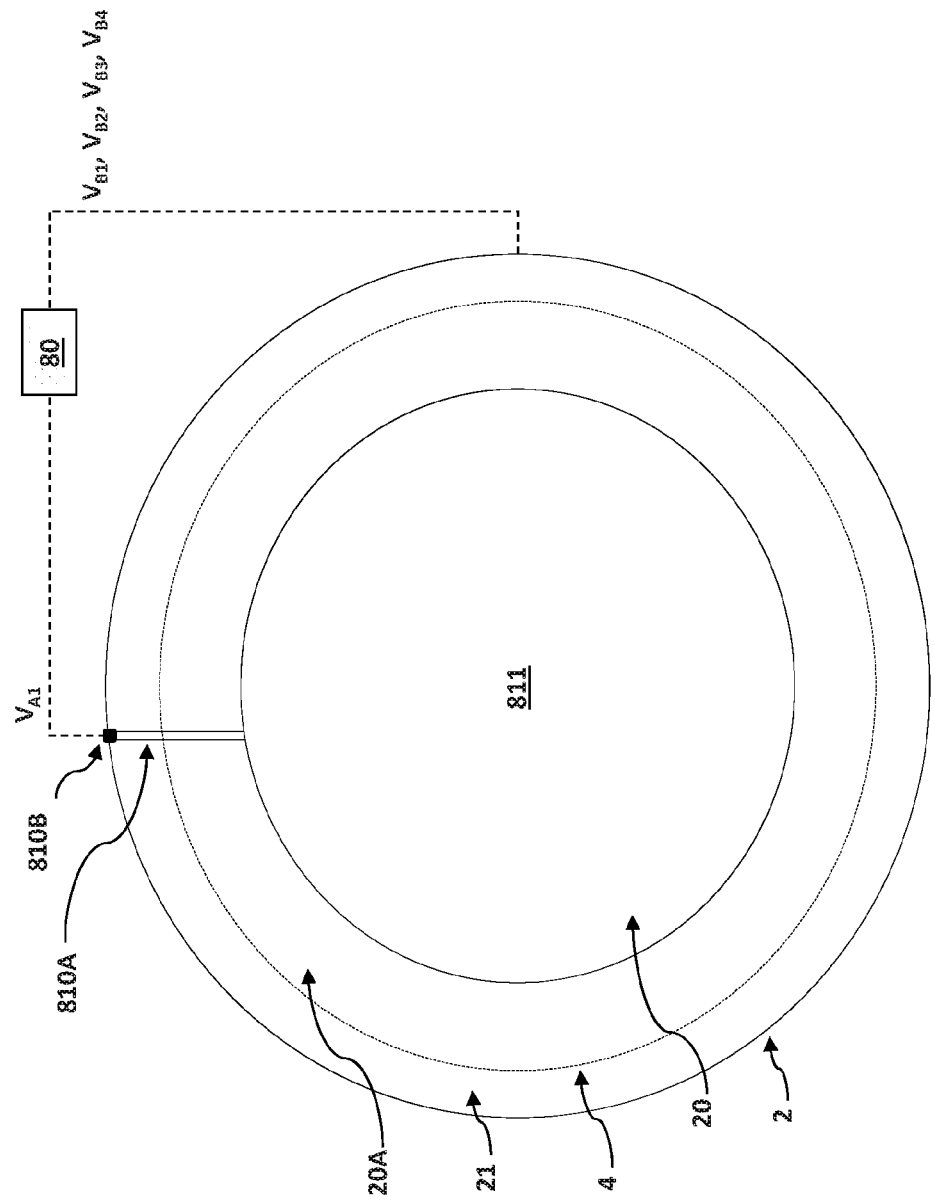
Figure 3:
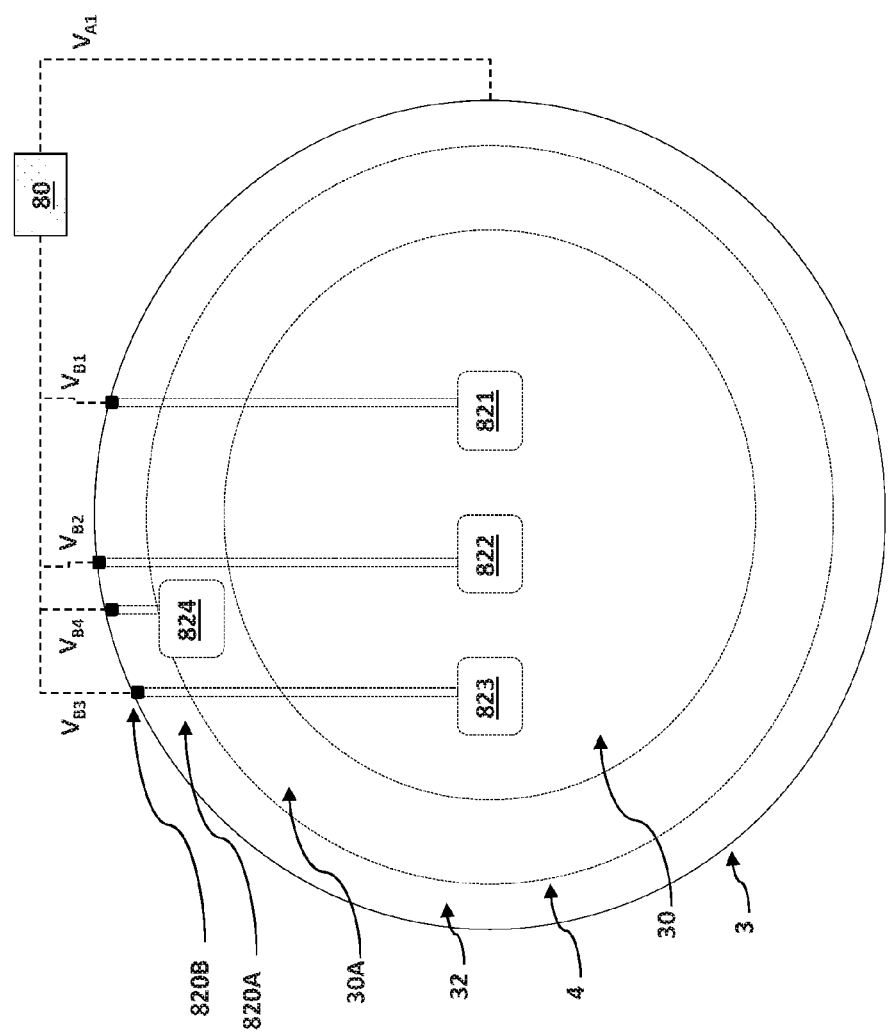
Figure 4:
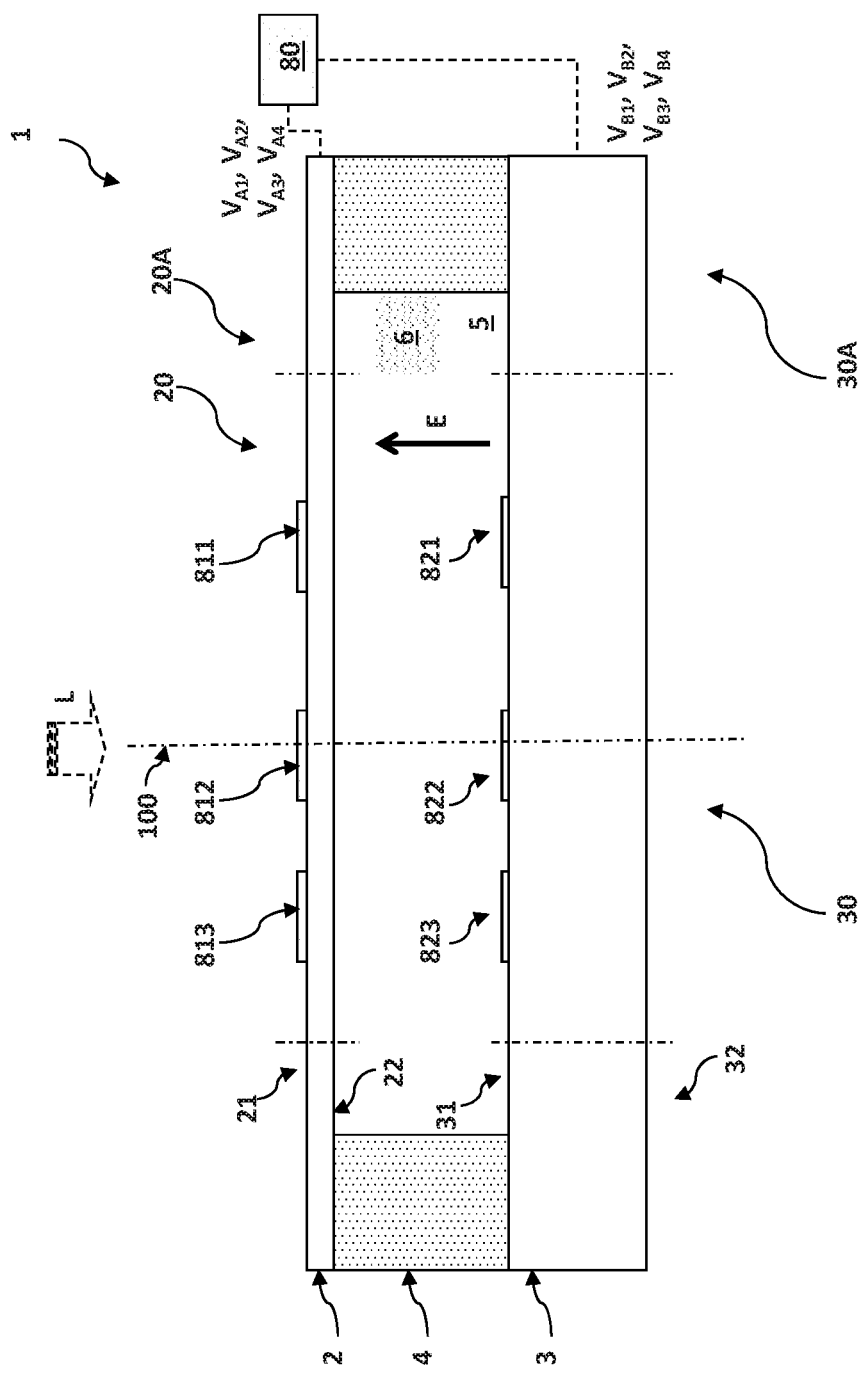
Figure 5:
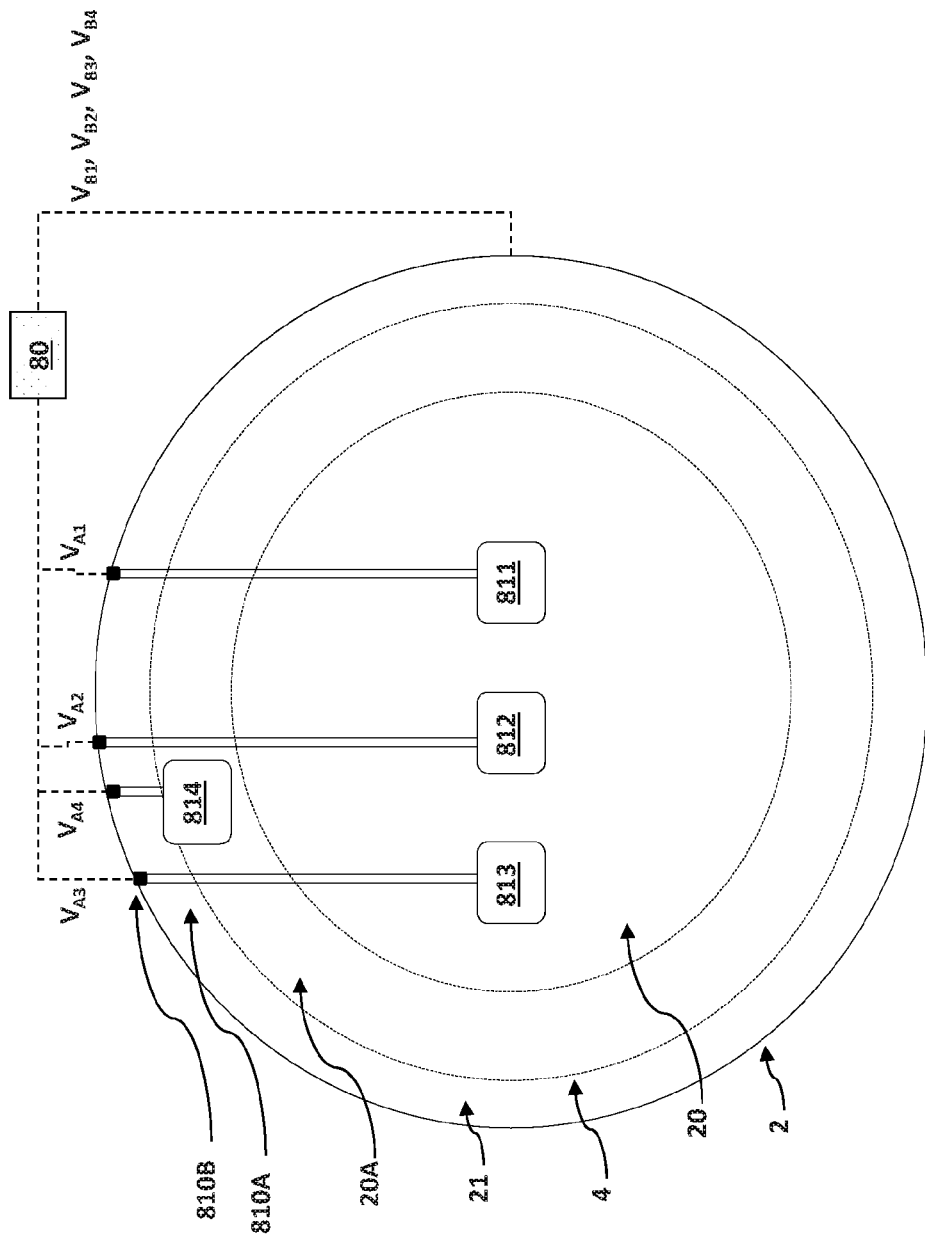
Figure 6:
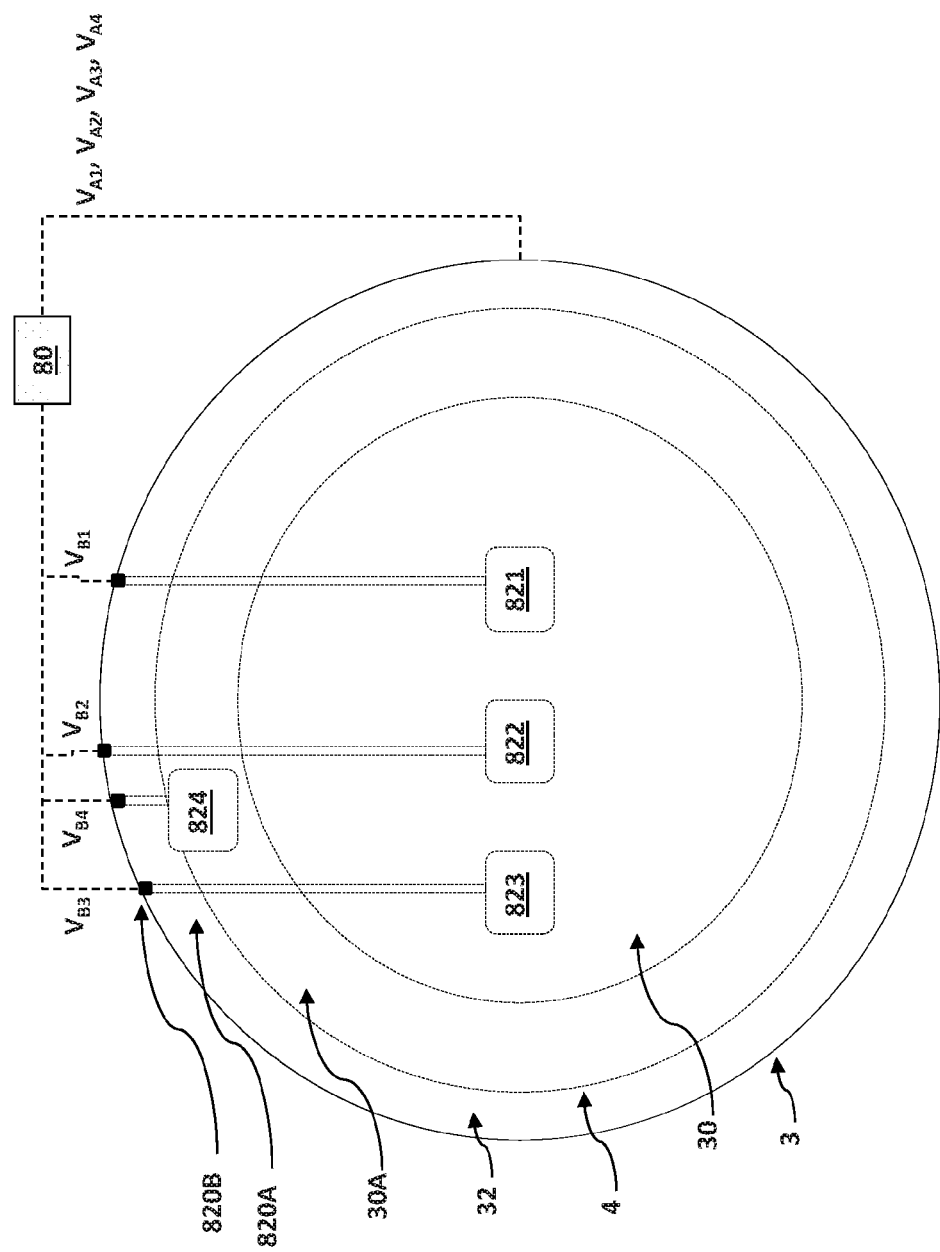
Figure 7:
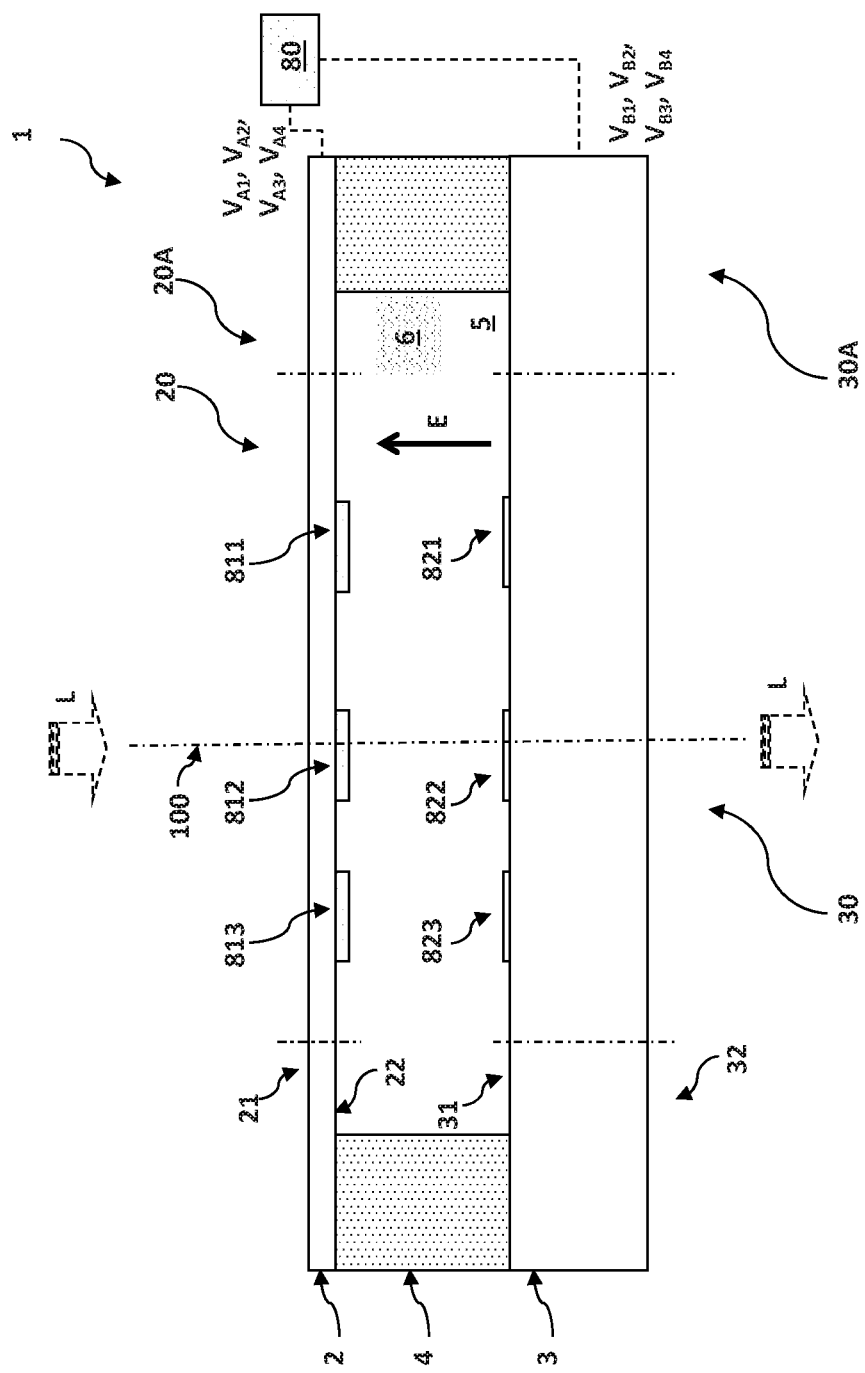
Figure 8:
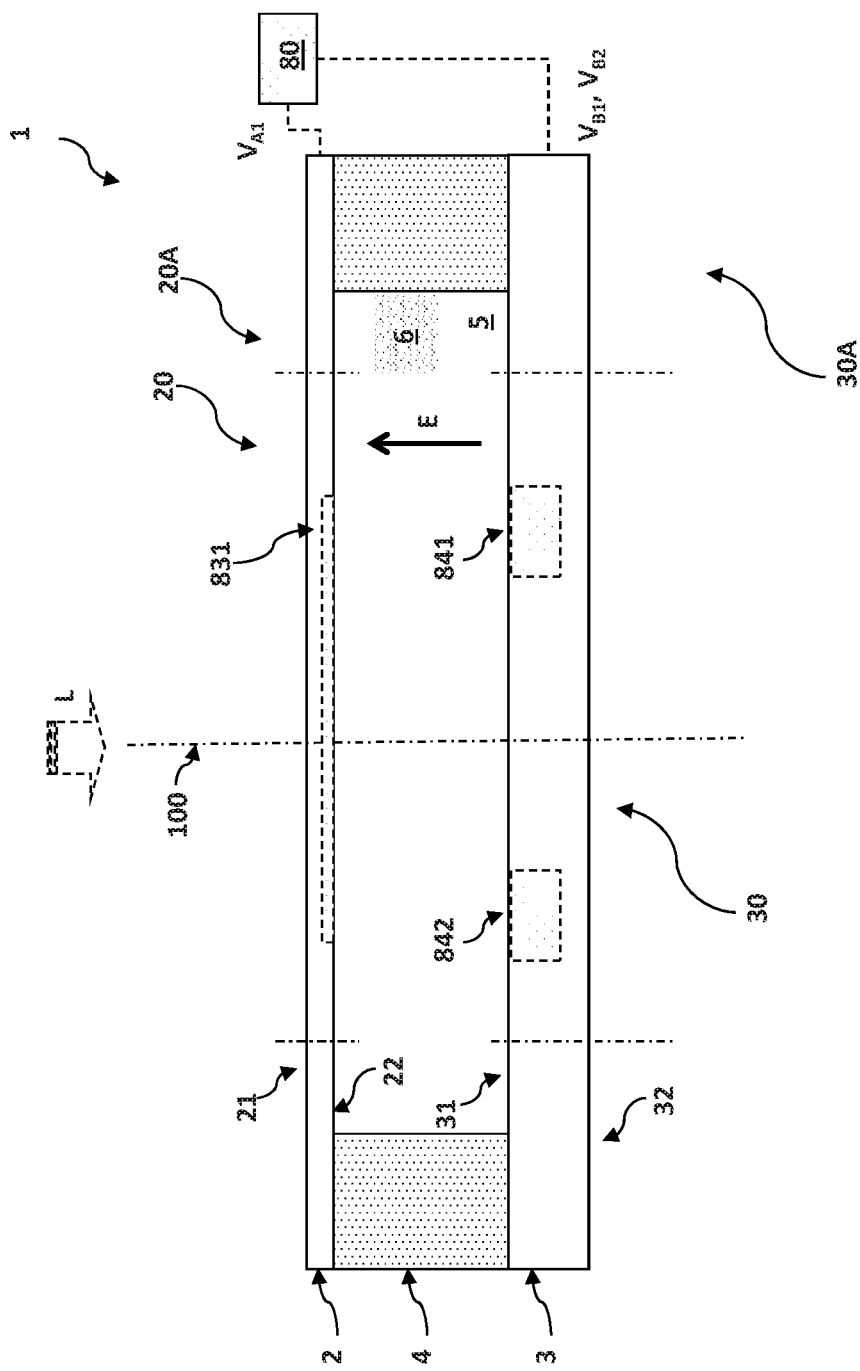
Figure 9:
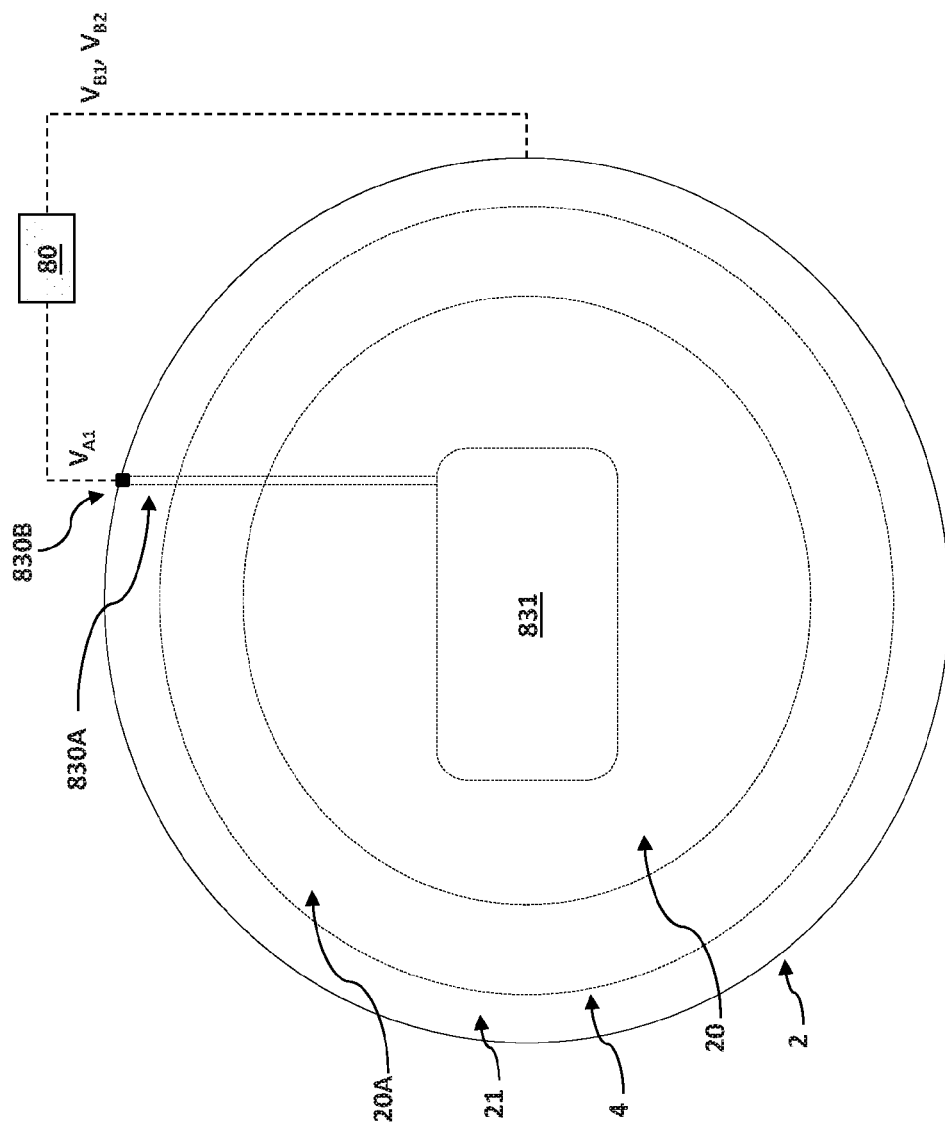
Figure 10:
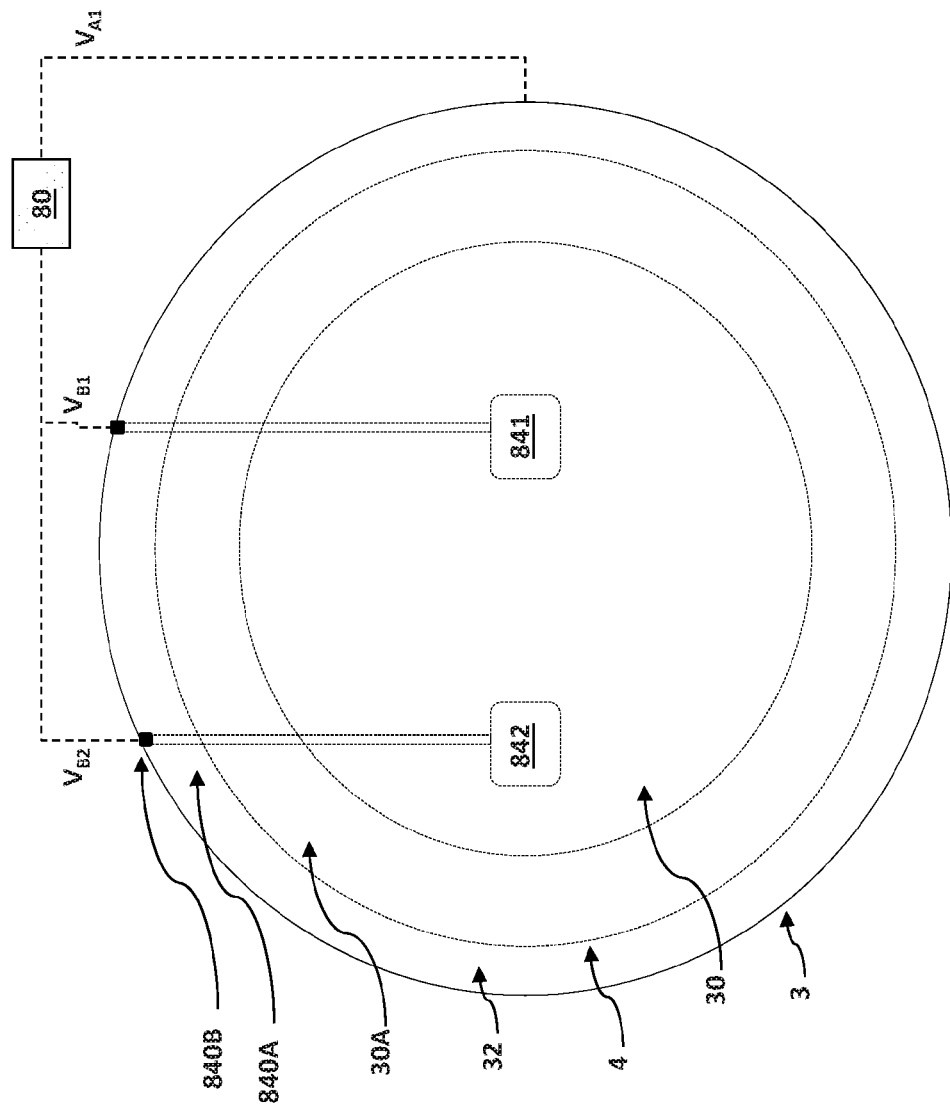
Figure 11:
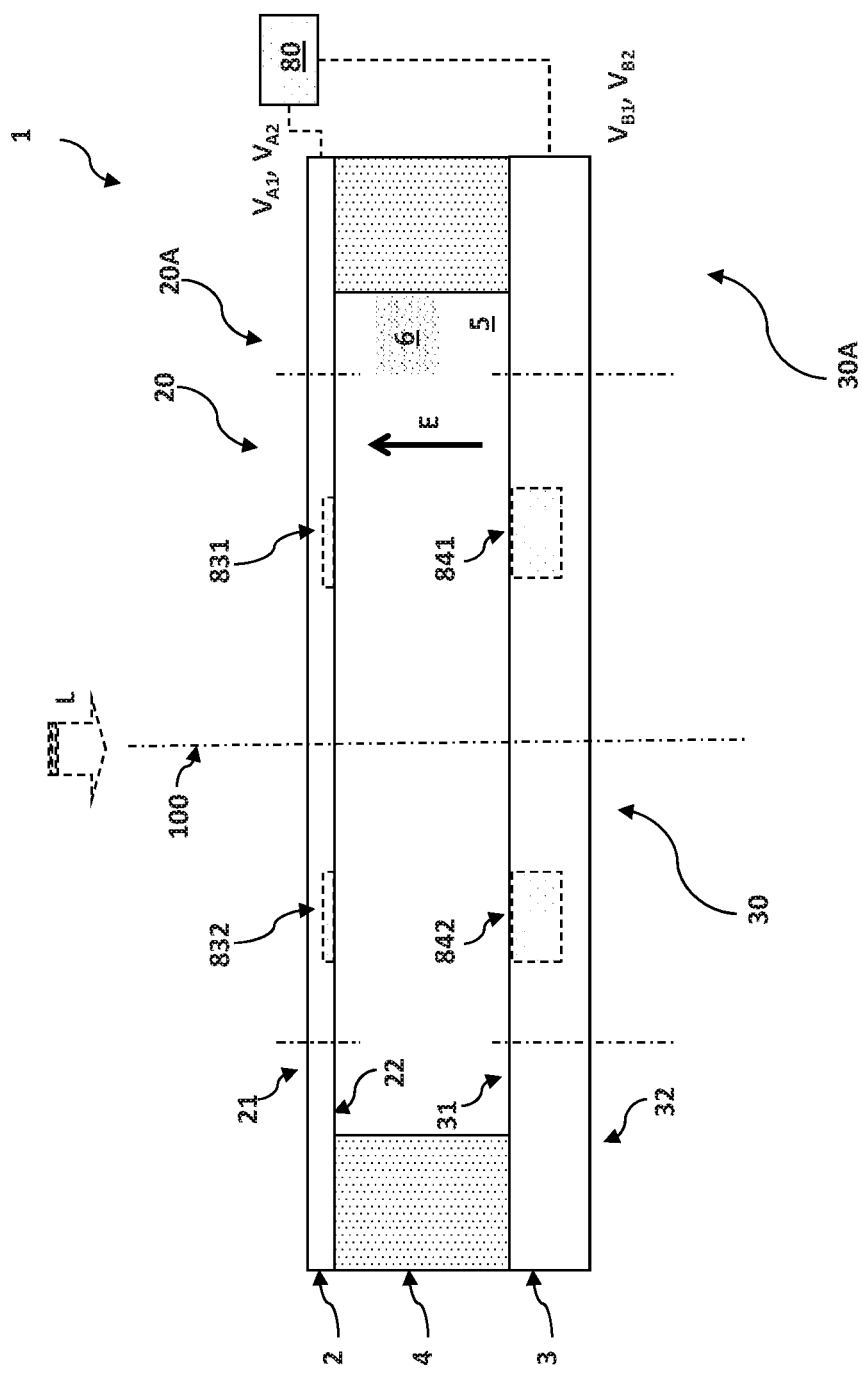
Figure 12:
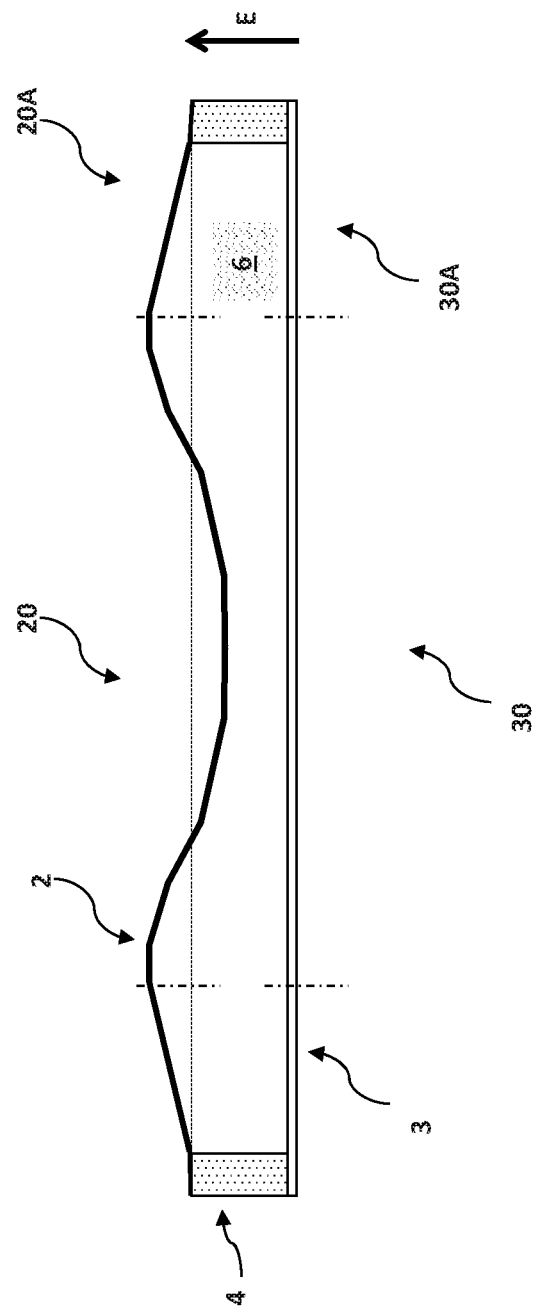
Figure 13:
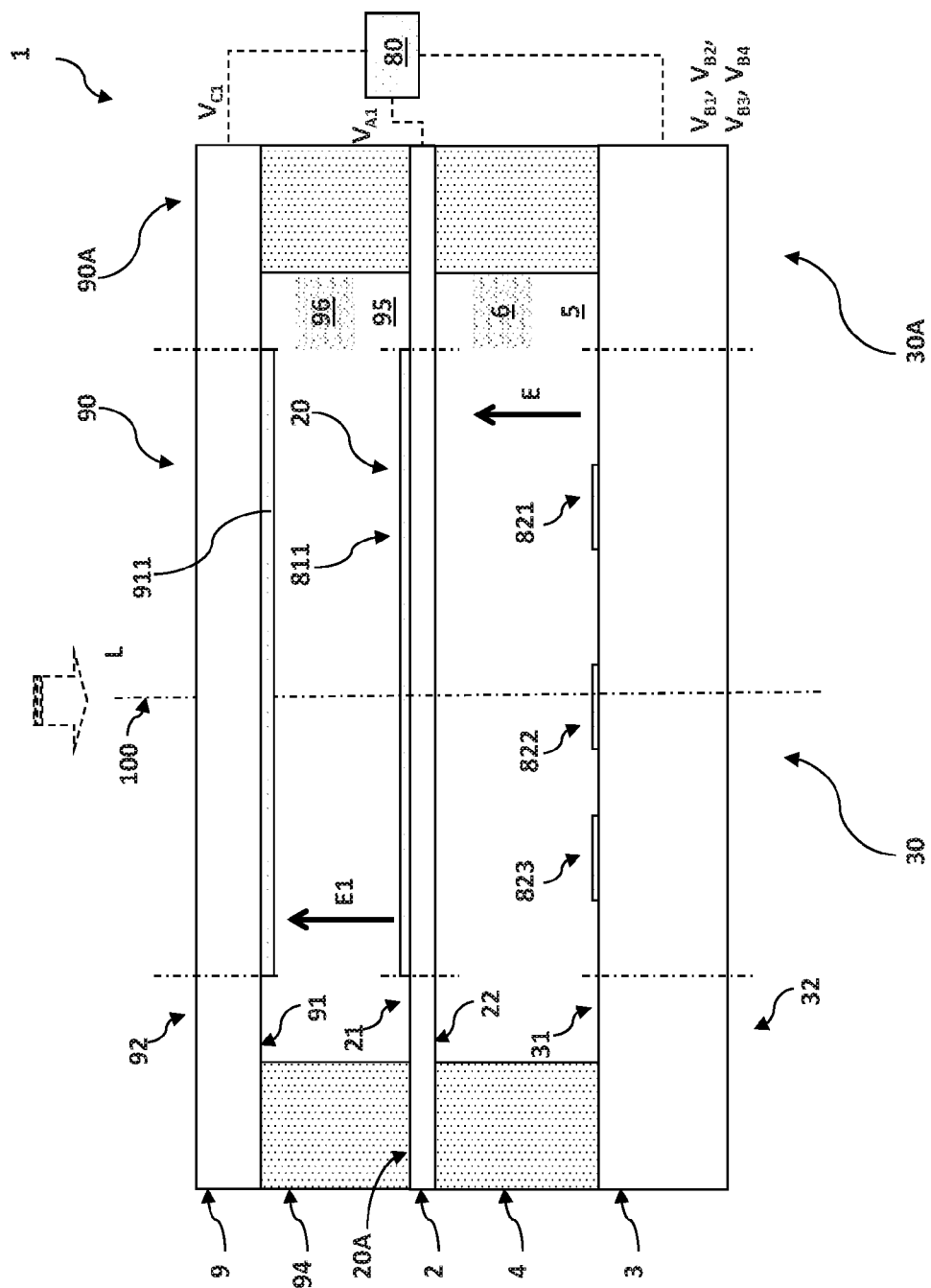

Further characteristics and advantages of the lens structure according to the invention will be more apparent with reference to the description given below and to the accompanying figures, provided purely for explanatory and non-limiting purposes, wherein:

FIGS. 1-3 schematically show the lens structure according to the invention in an embodiment thereof;

FIGS. 4-6 schematically show the lens structure according to the invention in an embodiment thereof;

FIG. 7 schematically shows a further embodiment of the lens structure according to the invention;

FIGS. 8-10 schematically show a further embodiment of the lens structure according to the invention;

FIG. 11 schematically shows a further embodiment of the lens structure according to the invention;

FIG. 12 schematically shows operation of some embodiments of the lens structure according to the invention;

FIG. 13 schematically shows a further embodiment of the lens structure according to the invention.

With reference to the aforesaid figures, the present invention refers to a deformable lens structure 1 for adaptive optics devices.

The lens structure 1 is provided with an optical axis 100 along which, in the use of the lens structure 1, an incident light beam L is transmitted.

The lens structure 1 comprises a first layer 2, elastically deformable in response to an applied force, a second layer 3, positioned spaced with respect to the first layer 2 and preferably rigid, and a spacer element 4, rigid and integrally connected to the first and second layer 2-3.

Within the scope of the present invention, the definition "elastically deformable layer" is intended, in the normal operation of the lens structure 1, as a layer (for example the layer 2) that is capable of returning to its original shape and volume when at rest, after undergoing mechanical deformation in response to an applied force.

The terms "rigid layer" or "rigid element" are intended, in normal operation of the lens structure 1, as a layer (for example the layer 3) or element (for example the spacer element 4) that does not undergo appreciable mechanical deformations in response to an applied force.

Preferably, the layer 2 has substantially planar geometry and, in conditions at rest, is arranged perpendicularly with respect to the optical axis 100.

Preferably, the layer 2 is formed by one or more substrates and/or films and/or regions of material, for example, polymer material, polymer gel, elastomer material, or the like.

Preferably, the layer 2 has a thickness of between 1 μm and 20 μm.

In practice, the layer 2 forms an elastically deformable membrane, integrally connected to the spacer element 4 and, in conditions at rest, arranged along a reference plane substantially perpendicular with respect to the optical axis 100.

The layer 2 is provided with a first outer surface 21 and with a first inner surface 22.

The first inner surface 22 is positioned opposite the first outer surface 21.

With reference to the optical axis 100, the layer 2 comprises a first central portion 20, transparent to the light beam L, which defines an optical aperture for the lens structure 1.

Advantageously, the central portion 20 is formed by a section of the layer 2 passing through the whole of the thickness thereof.

Preferably, it (for example in the shape of a cylinder) is positioned centred with respect to the optical axis 100.

With reference to the optical axis 100, the layer 2 comprises a first outer portion 20A, different from the first central portion 20, at which it is integrally connected to the spacer element 4.

Preferably, the outer portion 20A is formed by a section of the first layer 2 passing through the whole of the thickness thereof.

Preferably, it (for example in the shape of a cylindrical crown) is centred with respect to the optical axis 100 and positioned perimetrically with respect to the first central portion 20.

Also the outer portion 20A of the layer 2 can be transparent to the light beam L.

Preferably, the layer 3 forms a rigid support adapted to support the spacer element 4 and the layer 2.

Preferably, the layer 3 has substantially planar geometry and is formed by one or more substrates and/or films and/or regions of material, for example, glass, polymer material, composite material or the like.

Preferably, the layer 3 has a thickness between 100 μm and 1200 μm.

The layer 3 is provided with a second inner surface 31 and with a second outer surface 32.

The second inner surface 31 is positioned facing the first inner surface 22 of the layer 2.

The second outer surface 32 is positioned opposite the second inner surface 31.

With reference to the optical axis 100, the layer 3 comprises a second central portion 30, transparent to the light beam L, which defines the optical aperture of the lens structure 1.

Advantageously, the central portion 30 is formed by a section of the second layer 3 passing through the whole of the thickness thereof.

Preferably, it (for example in the shape of a cylinder) is centred with respect to the optical axis 100.

With reference to the optical axis 100, the layer 3 comprises a second outer portion 30A, different from the central portion 30, at which it is integrally connected to the spacer element 4.

Preferably, the outer portion 30A is formed by a section of the layer 3 passing through the whole of the thickness thereof.

Preferably, it (for example in the shape of a cylindrical crown) is centred with respect to the optical axis 100 and is positioned perimetrically with respect to the central portion 30.

Also the outer portion 30A can be transparent to the light beam L.

Preferably, the layers 2-3 are at least partially electrically insulating.

In the lens structure 1, the spacer element 4, integrally connected to the layers 2-3, is positioned between the first inner surface 22 of the first layer 2 and the second inner surface 31 of the second layer 3.

The spacer element 4 forms a rigid support adapted to maintain the layers 2-3 mutually spaced apart.

Preferably, the spacer element 4 (for example in the shape of a ring) is positioned perimetrically with respect to the first and second layer 2-3, at the outer portions 20A-30A thereof.

Preferably, it is positioned at the outer edges of the first and second layer 2-3 and at least partially defines the lateral walls of the lens structure 1.

The spacer element 4 can comprise one or more substrates and/or films and/or regions of material, for example, glass, polymer material, composite material or the like.

Preferably, the spacer element 4 is electrically insulating.

According to the invention, the spacer element 4 is arranged (for example by suitable adjusting the thickness thereof) so as to maintain the inner surfaces 22-31 of the layers 2-3 at a separation distance between 25 μm and 100 μm.

Preferably, the separation distance between the inner surfaces 22-31 is in the range between 35 μm and 65 μm.

Preferably, the separation distance between the inner surfaces 22-31 is 40 μm.

The lens structure 1 comprises an inner chamber 5 at least partially defined by the spacer element 4 and by the first and second layer 2-3.

In particular, with reference to a substantially vertical orientation of the optical axis 100, as shown in the aforesaid figures, the layers 2-3 at least partially define the upper (deformable) and lower (deformable or rigid) wall of the inner chamber 5, respectively, while the spacer element 4 defines the lateral walls thereof.

The inner chamber 5 contains an apolar liquid 6, electrically insulating and transparent to the light beam L.

The transparent liquid 6 occupies the whole volume of the inner chamber 5, so as to be in contact with the layers 2-3, respectively at the first inner surface 22 and at the second inner surface 31 thereof.

The transparent liquid 6 can, for example, be formed of liquid paraffin or similar substances. From the above, it is evident that, in the lens structure 1, the light beam L, incident on the outer surface 21 of the first layer 2 or the outer surface 32 of the layer 3, is capable of passing through the thickness of the lens structure through the optical aperture defined by the central portions 20-30 of the layers 2-3.

Preferably, the materials of the first and second central portion 20-30 of the first and second layer 2-3 and the transparent liquid 6 have homogeneous refractive indices.

Within the scope of the present invention, a material M1 (solid or liquid) is intended to have a refractive index that is "homogeneous" with the refractive index of a material M2 (solid or liquid), when the following relation occurs:

$$\left(\frac{R_{M1} - R_{M2}}{R_{M1}}\right) < 5\%$$

where $R_{M1}$ and $R_{M2}$ are the refractive indices of the materials M1, M2.

From an optical viewpoint, the lens structure 1 thus has a thickness without appreciable discontinuous surfaces, at least at the section through which the light beam L passes.

According to the invention, the lens structure 1 comprises one or more first electrostatic actuators 811, 812, 813, 831, 832 and one or more second electrostatic actuators 821, 822, 823, 841, 842, operatively associated with the first and second layer 2-3, respectively.

In particular, the first electrostatic actuators 811, 812, 813, 831, 832 are positioned at the first central portion 20 of the first layer 2 while the second electrostatic actuators 821, 822, 823, 841, 842 are positioned at the second central portion 30 of the second layer 3.

In practice, the aforesaid first and second electrostatic actuators are positioned at the optical aperture of the lens structure 1, through which the light beam L passes.

The aforesaid first and second electrostatic actuators are adapted to supply first and second control voltages $V_{A1}$, $V_{A2}$, $V_{A3}$, $V_{B1}$, $V_{B2}$, $V_{B3}$, selectively adjustable, to the first and second layer 2-3, in particular to the central portions 20-30 thereof.

Within the scope of the present invention, a control voltage is intended as "selectively adjustable" if it can be controlled so as to assume any desired value, even independently of the values assumed by other control voltages.

The control voltages $V_{A1}$, $V_{A2}$, $V_{A3}$, $V_{B1}$, $V_{B2}$, $V_{B3}$ supplied by the aforesaid first and second electrostatic actuators generate an electrostatic force field E between the first and second layer 2-3.

In the space between the layers 2-3 (i.e. in the volume of the inner chamber 5), the intensity of the force field E depends, point by point, on the aforesaid first and second control voltages (as the distance between the layers 2-3 and the dielectric constant of the liquid 6 are given).

In particular, for each point of the space between the layers 2-3, the intensity of the force field E depends on the difference, point by point, between the aforesaid first and second control voltages.

In other words, in the space between the layers 2-3, the intensity of the force field E depends, point by point, on the potential difference ΔV (actuation voltage) existing between the layers 2-3 and generated by the control voltages $V_{A1}$, $V_{A2}$, $V_{A3}$, $V_{B1}$, $V_{B2}$, $V_{B3}$.

The force field E between the layers 2-3 causes the onset of an electrostatic pressure thereon. Due to this electrostatic pressure, the layer 2, being elastically deformable, undergoes mechanical deformation, at least at the first central portion 20.

Preferably, the layer 3 preferably forms a rigid support for the spacer element 4 and the layer 2. In this case, although subjected to the electrostatic pressure generated by the force field E, it behaves like a rigid body and does not undergo any appreciable mechanical deformation. Likewise, the spacer element 4 behaves like a rigid body and does not undergo any appreciable mechanical deformation due to the aforesaid electrostatic pressure.

In the lens structure 1, the electrostatic actuators 811, 812, 813, 831, 832, 821, 822, 823, 841, 842, supplying the control voltages $V_{A1}$, $V_{A2}$, $V_{A3}$, $V_{B1}$, $V_{B2}$, $V_{B3}$, selectively adjustable, are capable of spatially modulating the values of potential difference ΔV between the layers 2-3 and, consequently, of spatially modulating the force field E and the electrostatic pressure, exerted thereby, on the deformable layer 2.

Therefore, the first and second electrostatic actuators are capable of deforming the layer 2, in particular the first central portion 20 thereof, in a controlled manner, according to a desired profile, in particular a profile such as to compensate any aberrations of the wavefront of the light beam L that passes through the lens structure 1.

According to the invention, in the use of said lens structure, the first central portion 20 is deformed according to profiles such as to compensate optical aberrations of an order greater than or equal to 2, excluding defocus, of the wavefront of said light beam L.

By appropriately adjusting the first and second control voltages, the central portion 20 of the layer 2 is therefore deformable according to complex profiles, for example according to polynomial functions that describe Zernike surfaces of an order greater than or equal to the second, excluding defocus.

Preferably, the first and second control voltages are selectively adjusted so that the potential difference ΔV between the layers 2-3 assumes values in a range between 200V and 300V.

Preferably, the first and second control voltages are selectively adjusted so that the potential difference ΔV between the layers 2-3 is 250V.

Due to the values selected for the separation distance between the layers 2-3 and for the control voltages $V_{A1}$, $V_{A2}$, $V_{A3}$, $V_{B1}$, $V_{B2}$, $V_{B3}$, the layer 2, in particular the central portion 20, is capable of becoming deformed, according to the complex profiles described above, with relatively high amplitude deformations, without causing structural collapse of the layer 2 (with relevant adhesion to the layer 3).

The lens structure 1 is thus capable of effectively correcting high order aberrations (excluding defocus) of the wavefront of the light beam L.

The lens structure 1 is thus particularly suitable for some types of application, such as video surveillance, astronomy, ophthalmology and microscopy, and the like.

In principle, the first electrostatic actuators 811, 812, 813, 831, 832 can be positioned at the first outer surface 21 and/or at the first inner surface 22 of the layer 2 while the second electrostatic actuators 821, 822, 823, 841, 842 can be positioned at the second inner surface 31 and/or at the second outer surface 32 of the layer 3.

According to some embodiments of the invention (FIGS. 1-3, 8-10), the lens structure 1 comprises a single first electrostatic actuator 811, 831.

In this case, the single electrostatic actuator 811 is preferably positioned at the first outer surface 21 of the layer 2 (FIGS. 1-3).

However, it can also be positioned at the first inner surface 22 of the layer 2.

According to other embodiments of the invention (FIGS. 4-7, 11), the lens structure 1 comprises a plurality of first electrostatic actuators 811, 812, 813, 831, 832.

In this case, the first electrostatic actuators are preferably positioned at the first outer surface 21 of the layer 2 (FIGS. 4-6).

According to other embodiments of the invention (FIG. 7), the first electrostatic actuators are positioned at the first inner surface 22 of the layer 2.

Preferably, the lens structure 1 comprises a plurality of second electrostatic actuators 821, 822, 823, 841, 842.

Preferably, the second electrostatic actuators 821, 822, 823, 841, 842 are positioned, with respect to one another, at a distance in the range between 80 μm and 120 μm.

Preferably, the second electrostatic actuators 821, 822, 823, 841, 842 are separated, with respect to one another, by a distance of 100 μm.

The second electrostatic actuators 821, 822, 823, 841, 842 are preferably positioned at the second inner surface 31 of the layer 3.

According to some embodiments of the invention, the lens structure 1 comprises one or more third electrostatic actuators 814 and one or more fourth electrostatic actuators 824, operatively associated with the first and second layer 2-3, respectively.

In particular, the third electrostatic actuators 814 are positioned at the first outer portion 20A of the first layer 2 while the fourth electrostatic actuators 824 are positioned at the second outer portion 30A of the second layer 3.

Preferably, also the third and fourth electrostatic actuators 814-824 are transparent to the light beam L.

The aforesaid third and fourth electrostatic actuators are adapted to supply third and fourth control voltages $V_{A4}$, $V_{B4}$, selectively adjustable, to the first and second layer 2-3, in particular to the outer portions 20A-30A thereof.

The control voltages $V_{A4}$, $V_{B4}$ supplied by the third and fourth electrostatic actuators contribute to generate an electrostatic force field E, capable of being spatially modulated, between the first and second layer 2-3.

Therefore, the third and fourth electrostatic actuators 814, 824 are capable of cooperating with the first and second electrostatic actuators 811, 812, 813, 831, 832, 821, 822, 823, 841, 842 to deform the layer 2, in particular the first central portion 20 thereof, according to a desired profile.

Also in this case, in the use of said lens structure, the first central portion 20 is deformed according to profiles such as to compensate optical aberrations of an order greater than or equal to 2, excluding defocus, of the wavefront of said light beam L.

The third electrostatic actuators 814 can be positioned at the first outer surface 21 and/or at the first inner surface 22 of the layer 2.

The fourth electrostatic actuators 824 can be positioned at the second inner surface 31 and/or at the second outer surface 32 of the layer 3.

Preferably, the first and second electrostatic actuators 811, 812, 813, 831, 832, 821, 822, 823, 841, 842 are electrically connected to an electronic control device 80 capable of generating and adjusting the first and second control voltages $V_{A1}$, $V_{A2}$, $V_{A3}$, $V_{B1}$, $V_{B2}$, $V_{B3}$.

Preferably, also the third and fourth electrostatic actuators 814, 824 are electrically connected to the control device 80 that is capable of generating and adjusting also the third and fourth control voltages $V_{A4}$, $V_{B4}$.

The control device 80 can be included in the lens structure 1 or, preferably, in the adaptive optics device or optical system in which the lens structure 1 is incorporated. It can advantageously comprise at least one microprocessor unit.

According to some embodiments of the invention (FIGS. 1-7), the first electrostatic actuators are formed by first electrically conductive actuator electrodes 811, 812, 813 transparent to the light beam L.

The actuator electrodes 811, 812, 813 are operatively connected to the first layer 2, at the first central portion 20 thereof.

In the case in which the lens structure 1 comprises a single first electrostatic actuator (FIGS. 1-3), this is preferably formed by a single electrically conductive actuator electrode 811 preferably connected to the first layer 2 at the first outer surface 21.

In the case in which the lens structure 1 comprises a plurality of first electrostatic actuators (FIGS. 4-6), these are preferably formed by a plurality of first electrically conductive actuator electrodes 811, 812, 813 and preferably connected to the first layer 2 at the first outer surface 21.

They could be positioned at the first inner surface 22 of the layer 2 (FIG. 7).

The actuator electrodes 811, 812, 813 can have any shape and dimensions, according to needs.

The number and arrangement of the first actuator electrodes 811, 812, 813, at the first central portion 20 of the layer 2, can be any.

As mentioned above, the lens structure 1 can comprise one or more third electrostatic actuators.

Preferably, the third electrostatic actuators are formed by third electrically conductive actuator electrodes 814 operatively connected to the first layer 2, at the first outer portion 20A of the first layer 2.

They can be operatively connected to the first layer 2, at the outer surface 21 (FIG. 4-6) and/or at the inner surface 22.

Also the number and arrangement of the third actuator electrodes 814, at the first outer portion 20A of the layer 2, can be any.

Preferably, also the third actuator electrodes 814 are transparent to the light beam L.

Preferably (FIGS. 1-6), the actuator electrodes 811, 812, 813, 814 are advantageously connected with corresponding drive channels of the control devices 80.

In this way, each actuator electrode 811, 812, 813, 814 is capable of supplying the first layer 2 with a corresponding control voltage $V_{A1}$, $V_{A2}$, $V_{A3}$, $V_{A4}$, selectively adjustable.

To connect the actuator electrodes 811, 812, 813, 814 with the control device 80, the lens structure 1 can comprise suitable conductive tracks (indicated collectively by the reference 810A).

Preferably, also the conductive tracks 810A are transparent to the light beam L.

Advantageously, the conductive tracks 810A connect the actuator electrodes 811, 812, 813, 814 with corresponding external electric contacts (indicated collectively by the reference 810B), in turn electrically connected with the control device 80.

Preferably (FIGS. 1-3), the second electrostatic actuators are formed by second electrically conductive actuator electrodes 821, 822, 823 transparent to the light beam L.

The actuator electrodes 821, 822, 823 are operatively connected to the second layer 3, at the second central portion 30 thereof.

Preferably, they are positioned at the second inner surface 31 of the layer 3.

As mentioned above, the lens structure 1 can comprise one or more fourth electrostatic actuators, operatively associated with the layer 3.

Preferably, the fourth electrostatic actuators are formed by fourth electrically conductive actuator electrodes 824 operatively connected to the second layer 3, at the second outer portion 30A thereof.

Preferably, also the fourth actuator electrodes 824 are transparent to the light beam L.

Preferably, they are positioned at the second inner surface 31 of the layer 3.

The actuator electrodes 821, 822, 823, 824 can have any shape and dimensions, according to needs.

The number and the arrangement of the second actuator electrodes 821, 822, 823, at the second central portion 30 of the layer 3, can be any as can the number and the arrangement of the fourth actuator electrodes 824, at the second outer portion 30A of the layer 3.

The actuator electrodes 821, 822, 823, 824 are advantageously connected with corresponding drive channels of the control device 80.

In this way, each actuator electrode 821, 822, 823, 824 is capable of supplying the second layer 3 with a corresponding control voltage $V_{B1}$, $V_{B2}$, $V_{B3}$, $V_{B4}$, selectively adjustable.

For connection of the actuator electrodes 821, 822, 823, 824 with the control device 80, the lens structure 1 can comprise suitable conductive tracks (indicated as a whole by the reference 820A).

Preferably, also the conductive tracks 820A are transparent to the light beam L.

Advantageously, the conductive tracks 820A connect the actuator electrodes 821, 822, 823, 824 with corresponding external electric contacts (indicated as a whole by the reference 820B), in turn electrically connected with the control device 80.

In the case in which it comprises a plurality of first electrostatic actuators, the lens structure 1 preferably comprises the same number of first and second actuator electrodes 811, 812, 813, 821, 822, 823.

In this case, the first actuator electrodes 811, 812, 813 and the second actuator electrodes 821, 822, 823 are advantageously arranged in the respective central portions 20-30 of the layers 2-3 so as to be mutually aligned (at least partially) according to axes parallel to the optical axis 100.

The actuator electrodes 811, 812, 813, 814, 821, 822, 823, 824, the conductive tracks 810A, 820A and the electric contacts 810B, 820B, can be obtained by depositing materials of ITO (Indium-Tin-Oxide) type on the corresponding surfaces of the layers 2-3. In this case, they are preferably obtained by sputtering or physical vapour deposition processes.

Alternatively, further conductive materials, for example conductive polymers or nano-structured materials (e.g. carbon nanotubes) can be used.

Preferably, in order to ensure adequate electric insulation between the actuator electrodes 811, 812, 813, 814, 821, 822, 823, 824, the relevant conductive tracks 810A, 820A and the corresponding electric contacts 810B, 820B, the layers 2-3 are at least partially electrically insulating.

The actuator electrodes 811, 812, 813, 814, 821, 822, 823, 824, the relevant conductive tracks 810A, 820A and the corresponding electric contacts 810B, 820B can be covered by a substrate (thin film) of electrically insulating material transparent to the light beam L.

This solution is particularly useful when the actuator electrodes 811, 812, 813, 814, 821, 822, 823, 824 are facing one another.

According to some embodiments of the invention (FIGS. 8-11), the first and second electrostatic actuators are formed respectively by one or more first actuation regions 831, 832 of the first layer 2 and by one or more second actuation regions 841, 842 of the second layer 3.

The first actuation regions 831, 832 are transparent to the light beam L.

The first actuation regions 831, 832 are positioned at the first central portion 20 of the layer 2.

The first actuation regions 831, 832 are electrically conductive and are electrically connected to the electronic control device 80.

For this purpose, the lens structure 1 preferably comprises suitable conductive tracks (indicated as a whole by the reference 830A), preferably positioned at the first inner surface 22 of the layer 2.

Advantageously, the conductive tracks 830A connect the actuation regions 831, 832, with corresponding external electric contacts (indicated as a whole by the reference 830B), in turn electrically connected with the control device 80.

The conductive tracks 830A are preferably transparent to the light beam L.

In the case in which the lens structure 1 comprises a single first electrostatic actuator (FIGS. 8-10), this is preferably formed by a single first electrically conductive actuation region 831.

This actuation region is preferably positioned at the first outer surface 21 of the layer 2.

In the case in which the lens structure 1 comprises a plurality of first electrostatic actuators (FIG. 11), these are preferably formed by a plurality of first electrically conductive actuation regions 831, 832.

These actuation regions are preferably positioned at the first inner surface 22 of the layer 2.

The second actuation regions 841, 842 are positioned at the second central portion 30 of the layer 3.

The second actuation regions 841, 842 are transparent to the light beam L.

They are preferably positioned at the first inner surface 22 of the layer 2.

The second actuation regions 841, 842 are electrically conductive and are electrically connected to the electronic control device 80.

For this purpose, the lens structure 1 preferably comprises suitable conductive tracks (indicated as a whole by the reference 840A), preferably positioned at the second outer surface 32 of the layer 3.

Advantageously, the conductive tracks 840A connect the actuation regions 841, 842, with corresponding external electric contacts (indicated as a whole by the reference 840B), in turn electrically connected with the control device 80.

The conductive tracks 830A are preferably transparent to the light beam L.

Preferably, the lens structure 1 comprises a plurality of second actuation regions 841, 842.

The actuation regions 831, 832, 841, 842 can have any shape and dimensions, according to needs.

Also the number and the arrangement of the actuation regions 831, 832, 841, 842, at the first central portion 20 of the layer 2 and at the second central portion 30 of the layer 3, can be any. Preferably, in the case in which it comprises a plurality of first actuation regions, the lens structure 1 comprises a same number of first and second actuation regions 831, 832, 841, 842.

In this case, the first actuation regions 831, 832 and the second actuation regions 841, 842 are arranged in the respective central portions 20-30 of the layers 2-3 so as to be mutually aligned (at least partially) according to axes parallel to the optical axis 100.

If the lens structure 1 comprises one or more third and fourth electrostatic actuators, these are preferably formed by third and fourth conductive regions (not shown) of the layers 2-3, positioned at the first and second outer portion 20A-30A of the layers 2-3, respectively.

Advantageously, suitable conductive tracks can connect the third and fourth actuation regions with corresponding external electric contacts, in turn electrically connected with the control device 80.

The aforesaid third actuation regions and the relevant electric contacts and conductive tracks are preferably positioned at the first inner surface 22 of the layer 2.

The aforesaid fourth actuation regions and the relevant electric contacts and conductive tracks are preferably positioned at the second inner surface 31 of the layer 3.

The actuation regions 831, 832, 841, 844, the conductive tracks 830A, 840A and the electric contacts 830B, 840B, can be obtained by means of suitable deposition processes and/or doping of material in suitable areas of the layers 2-3, as widely known in the processing of semiconductors.

The conductive tracks 830A, 840A and the electric contacts 830B, 840B can be obtained by depositing materials of ITO (Indium-Tin-Oxide) type on the corresponding surfaces of the layers 2-3, for example utilizing the techniques described above.

Preferably, in order to ensure adequate electric insulation between the actuation regions, the conductive tracks 830A, 840A and the corresponding electric contacts 830B, 840B, the layers 2-3 are at least partially electrically insulating.

The actuation regions 831, 832, 841, 844, the conductive tracks 830A, 840A and the electric contacts 830B, 840B can be covered by a substrate (thin film) of insulating material transparent to the light beam L.

According to the invention, the inner chamber 5 is hermetically closed so that the volume of the transparent liquid 6 is maintained constant when the central portion 20 of the layer 2 undergoes mechanical deformation.

In these embodiments of the invention, the layer 2, in its entirety, is deformed with relatively complex dynamics, for example of the type with "double curve", as schematically shown in FIG. 12.

At the first central portion 20, distant from the area of mechanical constraint with the spacer element 4, the layer 2 is essentially deformed by the action of the electrostatic pressure caused by the force field E.

The deformation of the first central portion 20 causes a movement of liquid 6 toward the peripheral regions of the inner chamber 5.

As the inner chamber 5 is hermetically closed, at the first outer portion 20A, next to the area of mechanical constraint with the spacer element 4, the layer 2 is deformed by the resultant between the electrostatic pressure exerted by the force field E and the pressure exerted by the liquid 6.

In normal operation of the lens structure 1, this is undoubtedly prevalent, in view of the values of electrostatic pressure at the outer portion 20a. This causes a swelling of the layer 2, at the outer portion 20A, with respect to a condition at rest (broken line).

From the above, it is evident how the presence of a liquid 6 with constant volume facilitates deformation of the layer 2 according to complex profiles, with high deformation dynamics.

The lens structure 1 may be subject to further modifications or variants, all of which fall within the scope of the present invention.

The layer 3 could also be elastically deformable.

In this case, the first and second electrostatic actuators 811, 812, 813, 831, 832, 821, 822, 823, 841, 842, supplying the first and second control voltages $V_{A1}$, $V_{A2}$, $V_{A3}$, $V_{B1}$, $V_{B2}$, $V_{B3}$, selectively adjustable, to the layers 2-3 are also capable of deforming the layer 3, in particular the second central portion 30 thereof, in a controlled manner, according to a desired profile, in particular a profile such as to compensate any aberrations of the wavefront of the light beam L that passes through the lens structure 1.

Positioning of the first and second electrostatic actuators at the central regions 20-30 of the layers 2-3 therefore also enables deformation of the layer 3 according to complex profiles, for example according to polynomial functions that have a plurality of maximum and minimum points at this central portion 30 (Zernike surfaces of an order greater than or equal to the second, excluding defocus).

The electrostatic actuators 821, 822, 823, 824, 841, 842, the conductive tracks 830A, 840A and the electric contacts 830B, 840B can be positioned at the second outer surface 32 of the second layer 3.

The conductive tracks 810A, 820A, 830A, 840A and the electric contacts 810B, 820B, 830B, 840B described above could be produced at the surfaces 21, 22, 31, 32 of the layers 2-3, or be at least partially embedded in the thickness of the layers 2-3.

Moreover, they could be at least partially obtained at surfaces of the spacer element 4 and/or embedded in the thickness thereof.

The path of the light beam L through the lens structure 1 can be inverted with respect to what is shown in the aforesaid figures, in which, by way of example, the light beam L is shown as entering/exiting from the lens structure 1 at the layers 2 and 3, respectively.

FIG. 13 shows a further embodiment of the lens structure 1.

According to this embodiment, the lens structure 1 comprises a third layer 9, positioned spaced with respect to the first layer 2 and preferably rigid, and a further spacer element 94, rigid and integrally connected to the first layer 2 and third layer 9.

Preferably, the layer 9 has substantially planar geometry and is formed by one or more substrates and/or films and/or regions of material, for example, glass, polymer material, composite material or the like.

Preferably, the third layer 9 has a thickness between 200 μm and 1200 μm. The third layer 9 is provided with a third inner surface 91 and with a third outer surface 92.

The third inner surface 91 is positioned facing the first outer surface 21 of the first layer 2.

The third outer surface 92 is positioned opposite the third inner surface 91.

With reference to the optical axis 100, the layer 9 comprises a third central portion 90 transparent to the light beam L.

Advantageously, the third central portion 90 is formed by a section of the third layer 9 passing through the whole of the thickness thereof.

Preferably, it (for example in the shape of a cylinder) is centred with respect to the optical axis 100.

The third central portion 90 defines the optical aperture of the lens structure 1 in cooperation with the central portions 20-30 of the layers 2-3.

With reference to the optical axis 100, the layer 9 comprises a third outer portion 90A, different from the third central portion 90, at which it is integrally connected to the further spacer element 94.

Preferably, the third outer portion 90A is formed by a section of the third layer 9 passing through the whole of the thickness thereof.

Preferably, it (for example in the shape of a cylindrical crown) is centred with respect to the optical axis 100 and is positioned perimetrically with respect to the third central portion 90.

Also the third outer portion 90A can be transparent to the light beam L.

Preferably, the layer 9 is at least partially electrically insulating.

The further spacer element 94, integrally connected to the first layer 2 and to the third layer 9, is positioned between the first outer surface 21 of the first layer 2 and the third inner surface 91 of the third layer 9.

It forms a rigid support adapted to maintain the first layer 2 and the third layer 9 mutually spaced apart.

Preferably, the further spacer element 94 (for example in the shape of a ring) is positioned perimetrically with respect to the layers 2 and 9, at the outer portions 20A and 90A thereof, respectively.

Preferably, the further spacer element 94 is positioned at the outer edges of the layers 2 and 9 and at least partially defines the lateral walls of the lens structure 1.

The further spacer element 94 can comprise one or more substrates and/or films and/or regions of material, for example, glass, polymer material, composite material or the like.

Preferably, the further spacer element 94 is electrically insulating.

Preferably, it has a thickness between 10 μm and 250 μm.

The lens structure 1 comprises a further inner chamber 95, at least partially defined by the spacer element 94, by the first layer 2 and by the third layer 9.

In particular, with reference to a substantially vertical orientation of the optical axis 100, as shown in FIG. 13, the layers 2 and 9 at least partially define the lower (deformable) and upper (deformable or rigid) wall of the further inner chamber 95, respectively, while the spacer element 94 defines the lateral walls thereof.

The inner chamber 95 contains a further liquid 96, transparent to the light beam L.

The further liquid 96 has a refractive index homogeneous with the refractive index of the fluid present outside the lens structure 1 that the light beam L passes through before reaching the lens structure 1.

The further transparent liquid 96 occupies the whole volume of the further inner chamber 95, so as to be in contact with the first layer 2 and with the third layer 9, at the first outer surface 21 and at the third inner surface 91 thereof, respectively.

Preferably, the further liquid 96 is apolar, electrically insulating and transparent to the light beam L.

Preferably, the further liquid 96 has a refractive index homogeneous with the refractive index of air.

Preferably, the inner chamber 95 is hermetically closed so that the volume of the transparent liquid 96 is maintained constant when the central portion 20 of the layer 2 undergoes a mechanical deformation.

Preferably, the transparent liquid 96 can be formed, for example, of liquid paraffin or similar substances.

Preferably, the lens structure 1 comprises one or more first fifth electrostatic actuators 911 operatively associated with the third layer 9, at the third central portion 90 of the third layer 9.

In practice, also the fifth electrostatic actuators 911 are positioned at the optical aperture of the lens structure 1, through which the light beam L passes.

The fifth electrostatic actuators 911 are adapted to supply fifth control voltages $V_{C1}$, selectively adjustable, to the third layer 9, in particular to the central portion 90 thereof.

The fifth control voltages $V_{C1}$ supplied by the fifth electrostatic actuators generate a further electrostatic force field E1 between the first layer 2 and the third layer 9, in cooperation with the first control voltages generated by the first electrostatic actuators described above.

In the space between the layers 2 and 9 (i.e. in the volume of the further inner chamber 95), the intensity of the force field E1 depends, point by point, on the first control voltages supplied by the first electrostatic actuators and on the fifth control voltages supplied by the fifth electrostatic actuators.

In particular, for each point of the space between the layers 2 and 9, the intensity of the force field E1 depends on the difference, point by point, between the aforesaid first and fifth control voltages.

The force field E1 cooperates with the force field E, generated by the first and second electrostatic actuators between the layers 2-3, to cause a deformation of the layer 2, at least at the first central portion 20.

Therefore, the first, second and fifth electrostatic actuators of the lens structure 1 are capable of deforming the layer 2, in particular the first central portion 20 thereof, in a controlled manner, according to a desired profile.

Also in this case, in the use of said lens structure, the first central portion 20 is deformed according to profiles such as to compensate optical aberrations of an order greater than or equal to 2, excluding defocus, of the wavefront of said light beam L.

In principle, the fifth electrostatic actuators 911 can be positioned at the third inner surface 91 and/or at the third outer surface 92 of the layer 9.

According to some embodiments of the invention (FIG. 13), the lens structure 1 comprises a single third electrostatic actuator 911.

In this case, the single electrostatic actuator 911 is preferably positioned at the third inner surface 91 of the layer 9.

According to other embodiments of the invention (not shown), the lens structure 1 comprises a plurality of fifth electrostatic actuators.

Preferably, the fifth electrostatic actuators 911 are electrically connected to the electronic control device 80 capable of generating and adjusting the fifth control voltages $V_{C1}$.

The fifth electrostatic actuators can be produced analogously to the first and second electrostatic actuators of the lens structure 1, described above.

They can be formed by corresponding fifth actuator electrodes operatively connected to the layer 9 or by corresponding fifth actuation regions of the layer 9.

Preferably, the fifth electrostatic actuators are advantageously connected with corresponding drive channels of the control device 80, by means of conductive tracks that can be produced analogously to the conductive tracks 810A, 820A, 830A and 840A described above.

The embodiment of the lens structure 1, shown in FIG. 13, enables extremely accurate control of the deformation of the layer 2, at the central portion 20, given that it enables compensation of any offset deformations of this layer, for example caused by a specific operating positioning of the lens structure 1.

In practice, it has been seen how with the lens structure 1 according to the invention it is possible to solve the problems of the prior art described, achieving the stated objects.

In the lens structure 1, the arrangement of first and second electrostatic actuators, in the central portions 20-30 of the layers 2-3, enables accurate control of deformation of the layer 2, at the central portion 20.

This enables controlled deformation of the main area of reflection of the incident light beam (the central portion 20) according to relatively complex profiles.

The lens structure 1 therefore enables aberrations of a relatively high order (greater than the second order) of an incident light beam to be corrected in a relatively easily.

The lens structure 1 also enables aberrations of an incident light beam with a high operational dynamic range, both in amplitude and in frequency, to be corrected relatively easily.

The lens structure 1 has a relatively simple structure, easy to miniaturize with known manufacturing processes.

It can therefore be incorporated in an adaptive optics device or optical system, without significantly complicating the overall structure thereof.

The lens structure 1 can be easily produced with known industrial processes (for example micro-machining operations of planar type), at relatively limited costs.

The invention claimed is:

1. A lens structure for adaptive optics devices, which comprises:
    an optical axis along which, in the use of said lens structure, a light beam (L) is transmitted;
    a first layer elastically deformable in response to an applied force, said first layer having a first outer surface and a first inner surface, opposite said first outer surface, said first layer comprising a first central portion transparent to said light beam (L);
    a second layer positioned spaced with respect to said first layer, said second layer having a second inner surface, facing said first inner surface, and a second outer surface, opposite said second inner surface, said second layer comprising a second central portion transparent to said light beam (L), said first and second central portions defining an optical aperture of said lens structure;
    a spacer element positioned between said first inner surface and said second inner surface and integrally connected to said first and second layer, said spacer element being arranged so that the separation distance between said first and second inner surface is in the range between 25 µm and 100 µm;
    an inner chamber at least partially defined by said first and second layer and by said spacer element, said inner chamber containing an electrically insulating apolar liquid, transparent to said light beam (L) and in contact with said first and second layer, said inner chamber being closed with respect to the outside environment so as to maintain the volume of said transparent liquid constant, when said first layer is deformed;
    one or more first electrostatic actuators transparent to said light beam (L), said first electrostatic actuators being operatively associated with said first layer and positioned at said first central portion;
    one or more second electrostatic actuators transparent to said light beam (L), said second electrostatic actuators being operatively associated with said second layer and positioned at said second central portion;
    wherein the first and second electrostatic actuators are closer to a center of the lens structure than the spacer;
    wherein said first and second electrostatic actuators are adapted to supply control voltages (to generate at least one electrostatic force field (E), between said first and second layer, capable of causing a deformation of said first central portion;
    wherein, in the use of said lens structure, said first central portion is deformed according to profiles such as to compensate optical aberrations of an order greater than or equal to 2, excluding defocus, of the wavefront of said light beam.

2. The lens structure according to claim 1, wherein said spacer element is arranged so that the separation distance between said first and second inner surface is in the range between 30 µm and 65 µm.

3. The lens structure according to claim 2, wherein said spacer element is arranged so that the separation distance between said first and second inner surface is 40 µm.

4. The lens structure according to claim 2, wherein said first and second central portion and said transparent liquid have homogeneous refractive indices.

5. The lens structure according to claim 2, wherein said second layer forms a rigid support for said spacer element and said first layer.

6. The lens structure according to claim 2, wherein said first electrostatic actuators are formed by first electrically conductive actuator electrodes operatively connected to said first layer at said first central portion.

7. The lens structure according to claim 3, wherein said first and second central portion and said transparent liquid have homogeneous refractive indices.

8. The lens structure according to claim 3, wherein said second layer forms a rigid support for said spacer element and said first layer.

9. The lens structure according to claim 3, wherein said first electrostatic actuators are formed by first electrically conductive actuator electrodes operatively connected to said first layer at said first central portion.

10. The lens structure according to claim 1, wherein said first and second central portion and said transparent liquid have homogeneous refractive indices.

11. The lens structure according to claim 10, wherein said second layer forms a rigid support for said spacer element and said first layer.

12. The lens structure according to claim 10, wherein said first electrostatic actuators are formed by first electrically conductive actuator electrodes operatively connected to said first layer at said first central portion.

13. The lens structure according to claim 1, wherein said second layer forms a rigid support for said spacer element and said first layer.

14. The lens structure according to claim 1, wherein said first electrostatic actuators are formed by first electrically conductive actuator electrodes operatively connected to said first layer at said first central portion.

15. The lens structure according to claim 1, wherein said second electrostatic actuators are formed by second electrically conductive actuator electrodes operatively connected to said second layer at said second central portion.

16. The lens structure according to claim 1, wherein said first electrostatic actuators are formed by one or more first electrically conductive actuation regions of said first layer.

17. The lens structure according to claim 1, wherein said second electrostatic actuators are formed by one or more second electrically conductive actuation regions of said second layer.

18. The lens structure according to claim 1, which comprises:
- a third layer positioned spaced with respect to said first layer, said third layer having a third inner surface, facing said first outer surface, and a third outer surface, opposite said third inner surface, said third layer comprising a third central portion transparent to said light beam;
- a further spacer element positioned between said first outer surface and said third inner surface and integrally connected to said first and third layer;
- a further inner chamber containing a further electrically insulating apolar liquid, transparent to said light beam (L) and having a refractive index homogeneous with the refractive index of a fluid present in the environment outside said lens structure, said transparent liquid being in contact with said first and third layer, said further inner chamber being closed with respect to the outside environment so as to maintain the volume of said transparent liquid constant when said first layer is deformed;
- one or more fifth electrostatic actuators transparent to said light beam (L), said fifth electrostatic actuators being operatively associated with said third layer and positioned at said third central portion, wherein said fifth electrostatic actuators are adapted to supply fifth control voltages ($V_{C1}$) to generate a further electrostatic force field (E1) between said first and third layer, capable of causing a deformation of said first central portion.

19. An adaptive optics device, which comprises a lens structure according to claim 1.

20. An optical system, which comprises a lens structure according to claim 1.

21. The lens structure of claim 1, wherein the first and second electrostatic actuators are adapted to supply control voltages to simultaneously generate at least two different and electrostatic fields (E) at two different points of the first central portion such that the resulting deformation of said first central portion simultaneously includes at least two different shapes.

22. The lens structure of claim 21, wherein the at least two different shapes includes a peak and a trough simultaneously present in the first central portion.

23. The lens structure of claim 1, wherein the one or more first electrostatic actuators comprises a plurality of first actuators, at least one of the plurality of first actuators being closer to a center of the first layer than another of the plurality of first actuators.

24. The lens structure of claim 1, wherein the one or more second electrostatic actuators comprises a plurality of second actuators, at least one of the plurality of second actuators being closer to a center of the second layer than another of the plurality of second actuators.

25. A lens structure for adaptive optics devices adapted to receive a light beam, comprising:
- a first layer elastically deformable in response to an applied force, said first layer comprising a first central portion transparent to said light beam;
- a second layer comprising a second central portion transparent to said light beam, said first and second central portions defining an optical aperture of said lens structure;
- a spacer positioned between said first inner surface and said second inner surface;
- an inner chamber at least partially defined by said first and second layers and by said spacer element;
- a fluid in the inner chamber, the fluid being transparent to said light beam;
- at least one first electrostatic actuator transparent to said light beam and operatively associated with said first layer at said first central portion;
- at least one second electrostatic actuator transparent to said light beam and operatively associated with said second layer at said second central portion;
- said first and second electrostatic actuators are adapted to supply control voltages to generate at least two distinct electrostatic fields between said first and second layer to thereby causing a deformation of said first central portion, the deformation including at least two different shapes.

* * * * *